United States Patent
Skalecki et al.

(10) Patent No.: US 10,110,423 B2
(45) Date of Patent: Oct. 23, 2018

(54) SYSTEM AND METHOD FOR MANAGING NETWORK CONNECTIONS

(71) Applicant: Ciena Corporation, Hanover, MD (US)

(72) Inventors: Darek Skalecki, Ottawa (CA); Gerard Leo Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 273 days.

(21) Appl. No.: 15/202,680

(22) Filed: Jul. 6, 2016

(65) Prior Publication Data

US 2018/0013613 A1 Jan. 11, 2018

(51) Int. Cl.
| | |
|---|---|
| H04L 12/24 | (2006.01) |
| H04L 12/707 | (2013.01) |
| H04L 12/26 | (2006.01) |
| H04L 12/801 | (2013.01) |

(52) U.S. Cl.
CPC .......... *H04L 41/0668* (2013.01); *H04L 43/16* (2013.01); *H04L 45/22* (2013.01); *H04L 47/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,093,824 A | * | 3/1992 | Coan | H04J 3/085 370/228 |
| 7,885,179 B1 | * | 2/2011 | Bryant | H04L 12/4633 370/216 |
| 8,134,954 B2 | * | 3/2012 | Godfrey | H04L 29/06 370/254 |
| 2010/0177641 A1 | * | 7/2010 | Farkas | H04L 41/0677 370/242 |
| 2012/0173905 A1 | * | 7/2012 | Diab | H04L 12/66 713/320 |
| 2017/0118066 A1 | * | 4/2017 | Mathew | H04L 41/0663 |

* cited by examiner

*Primary Examiner* — Gregory B Sefcheck
*Assistant Examiner* — Jenkey Van
(74) *Attorney, Agent, or Firm* — Clements Bernard Walker PLLC; Christopher L. Bernard; Lawrence A. Baratta, Jr.

(57) ABSTRACT

A method for managing network connections may include identifying a network failure within a network comprising various network elements. The method may include selecting, in response to identifying the network failure and for the network elements, a subset of nodal maps from various nodal maps. The nodal maps may be stored on the network elements. The subset of nodal maps may describe various cross-connections of the nodal maps within a first end-to-end connection in the network. The method may include transmitting, in response to selecting the subset of nodal maps, various activation requests to trigger the network elements to implement the subset of nodal maps.

17 Claims, 9 Drawing Sheets

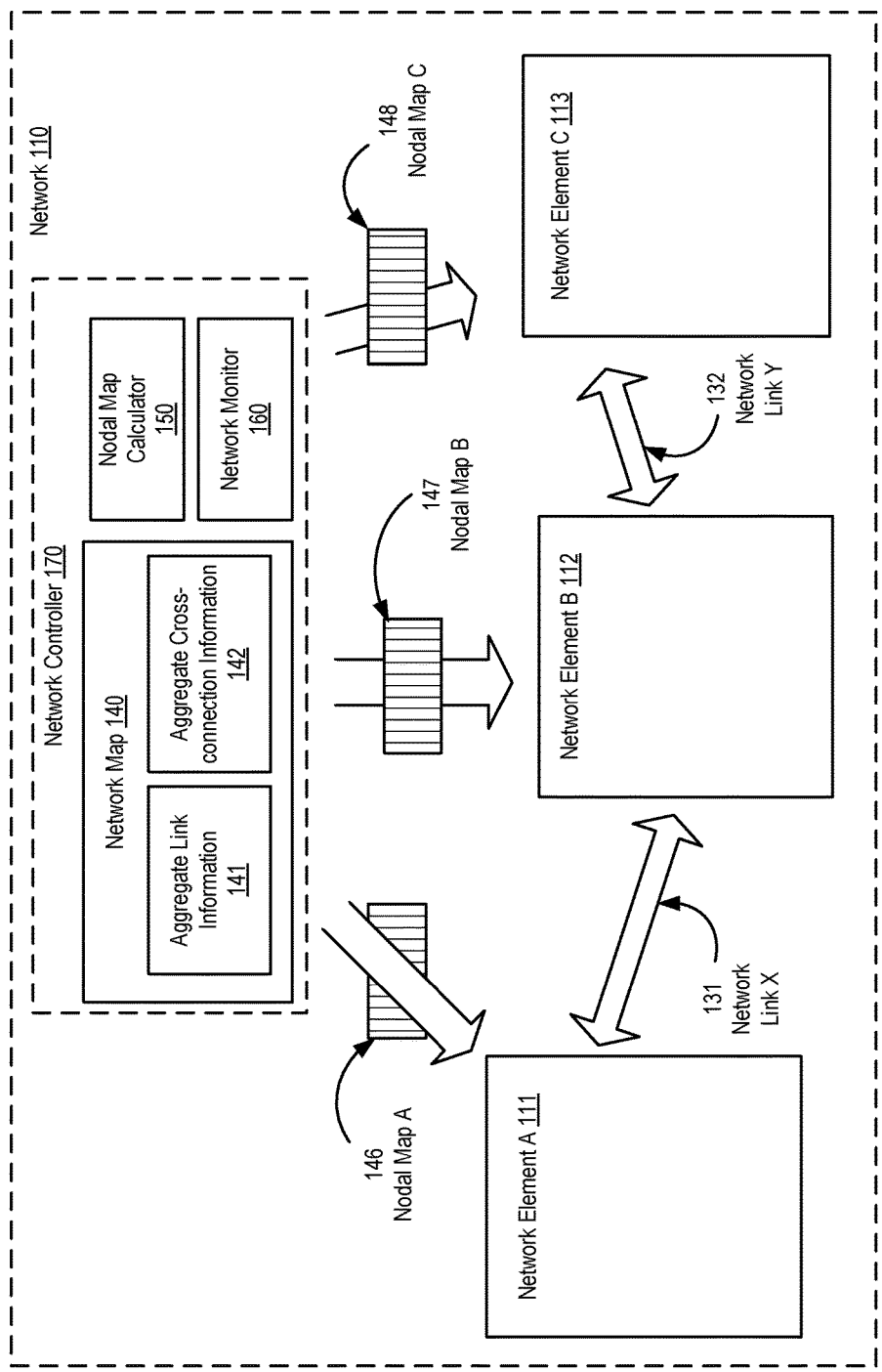
FIG. 1.1

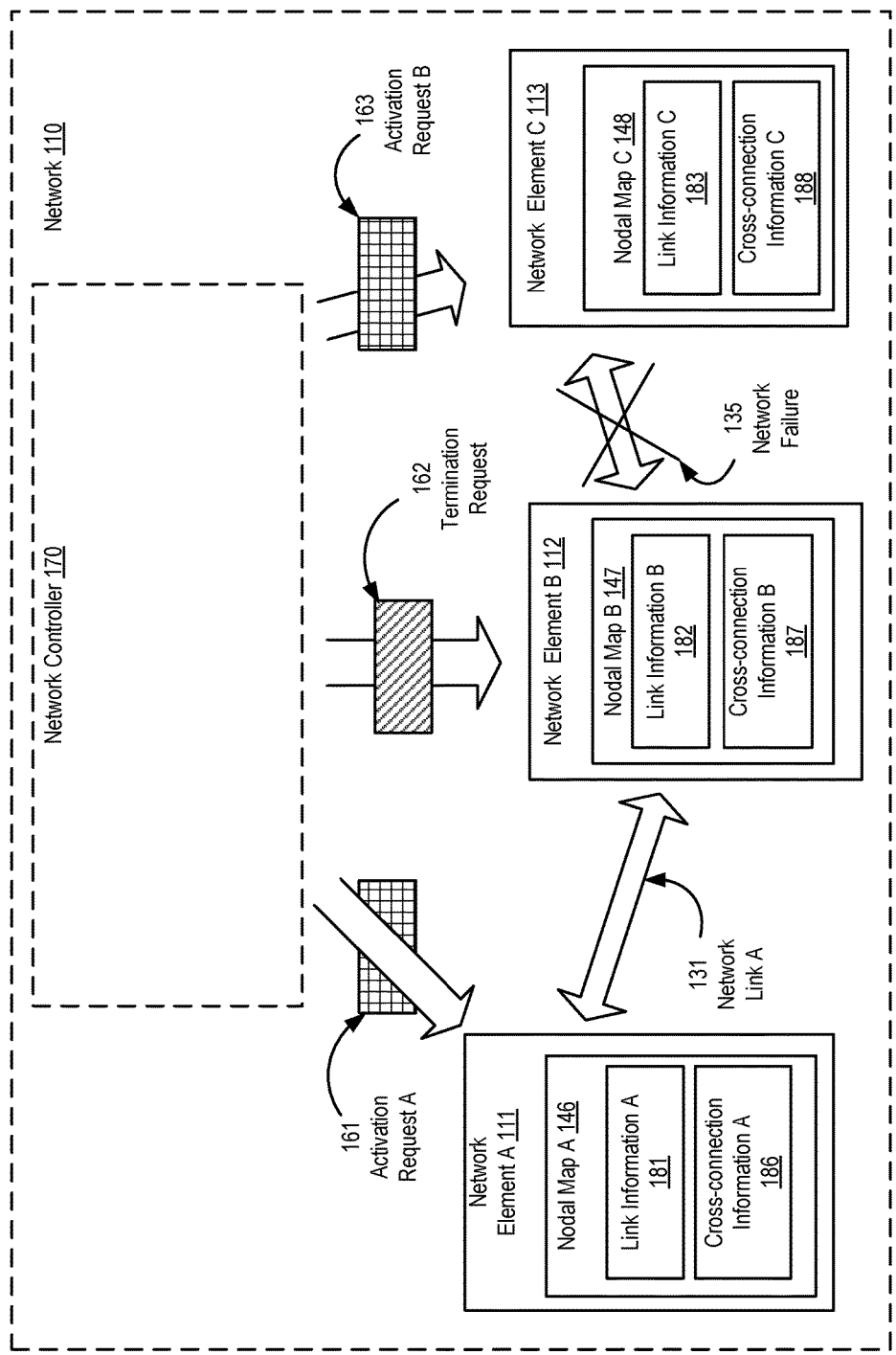
FIG. 1.2

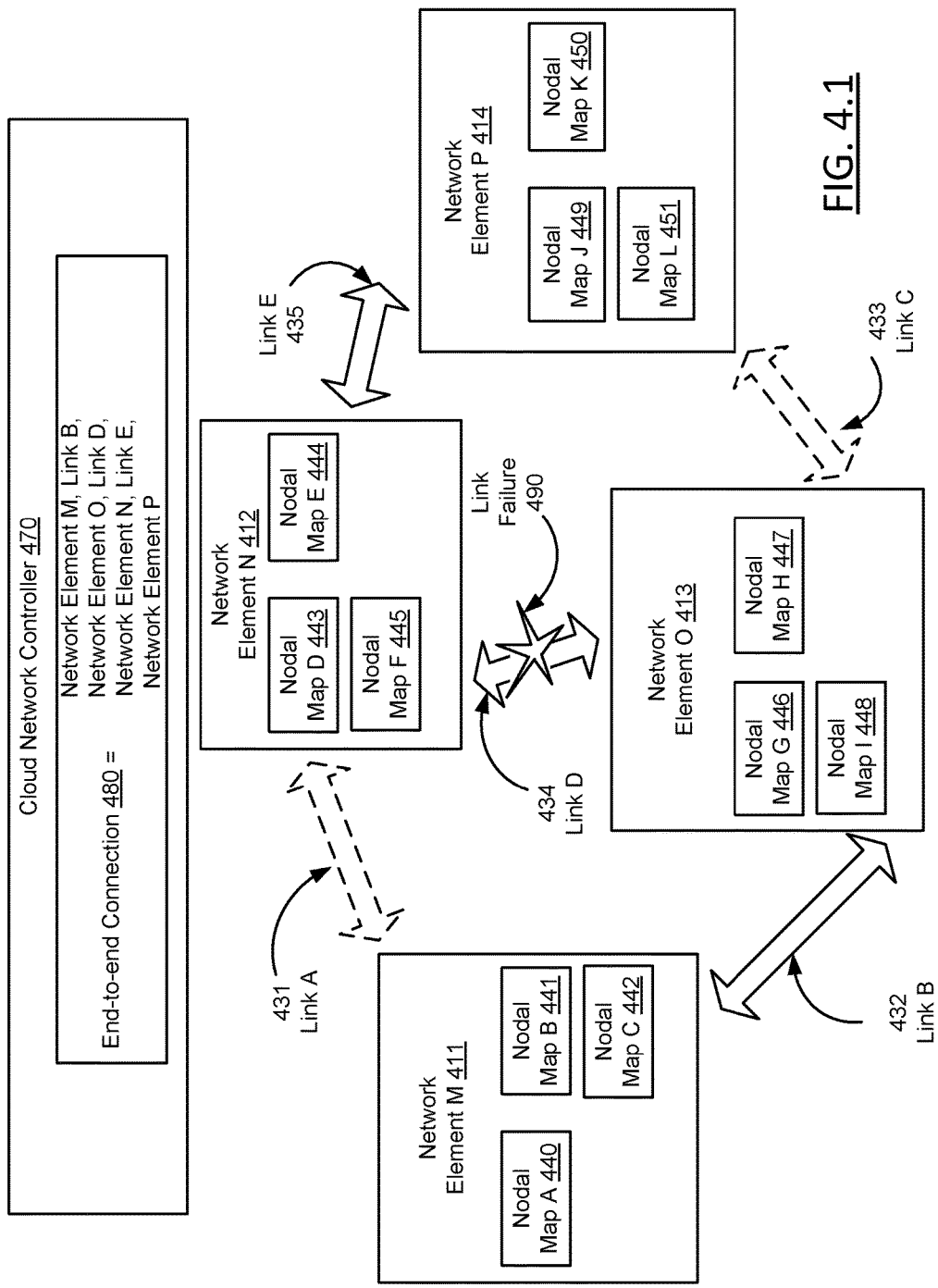
FIG. 4.1

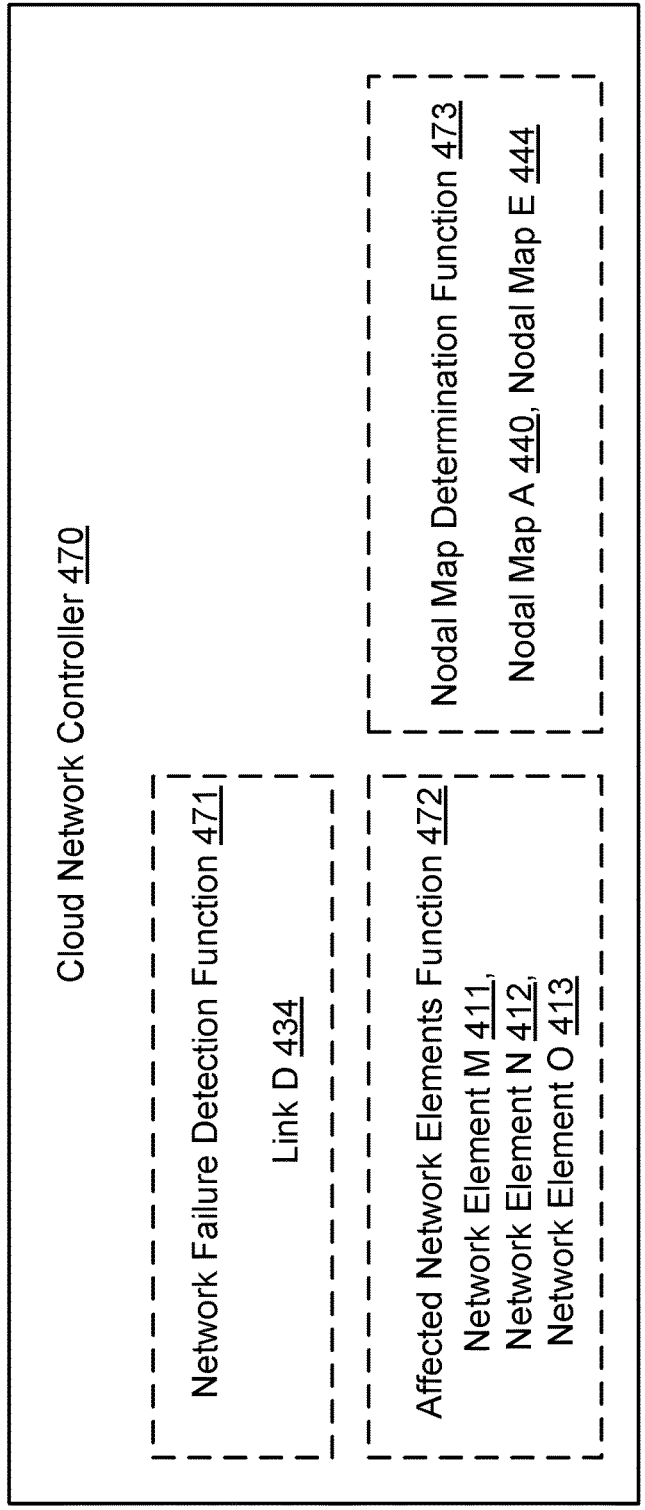
FIG. 4.2

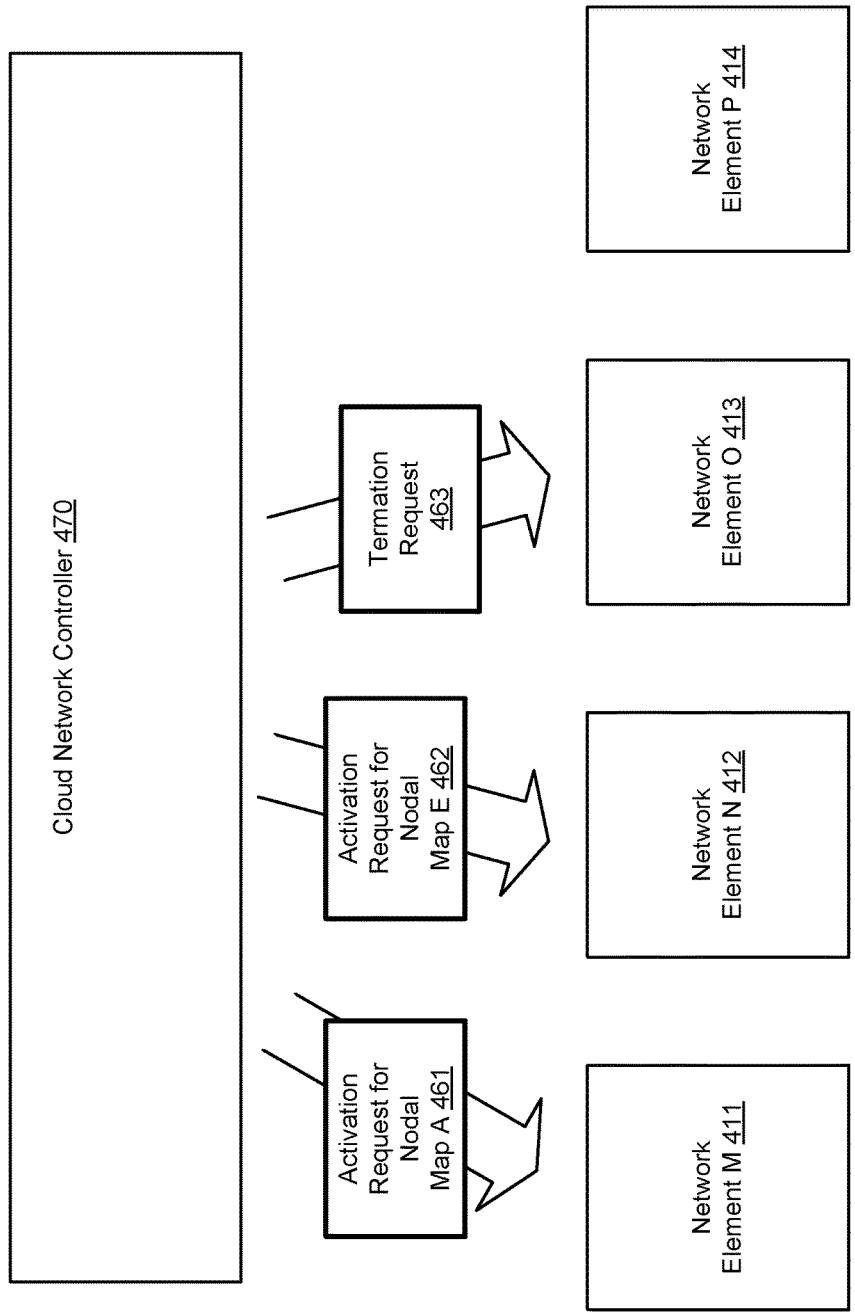
FIG. 4.3

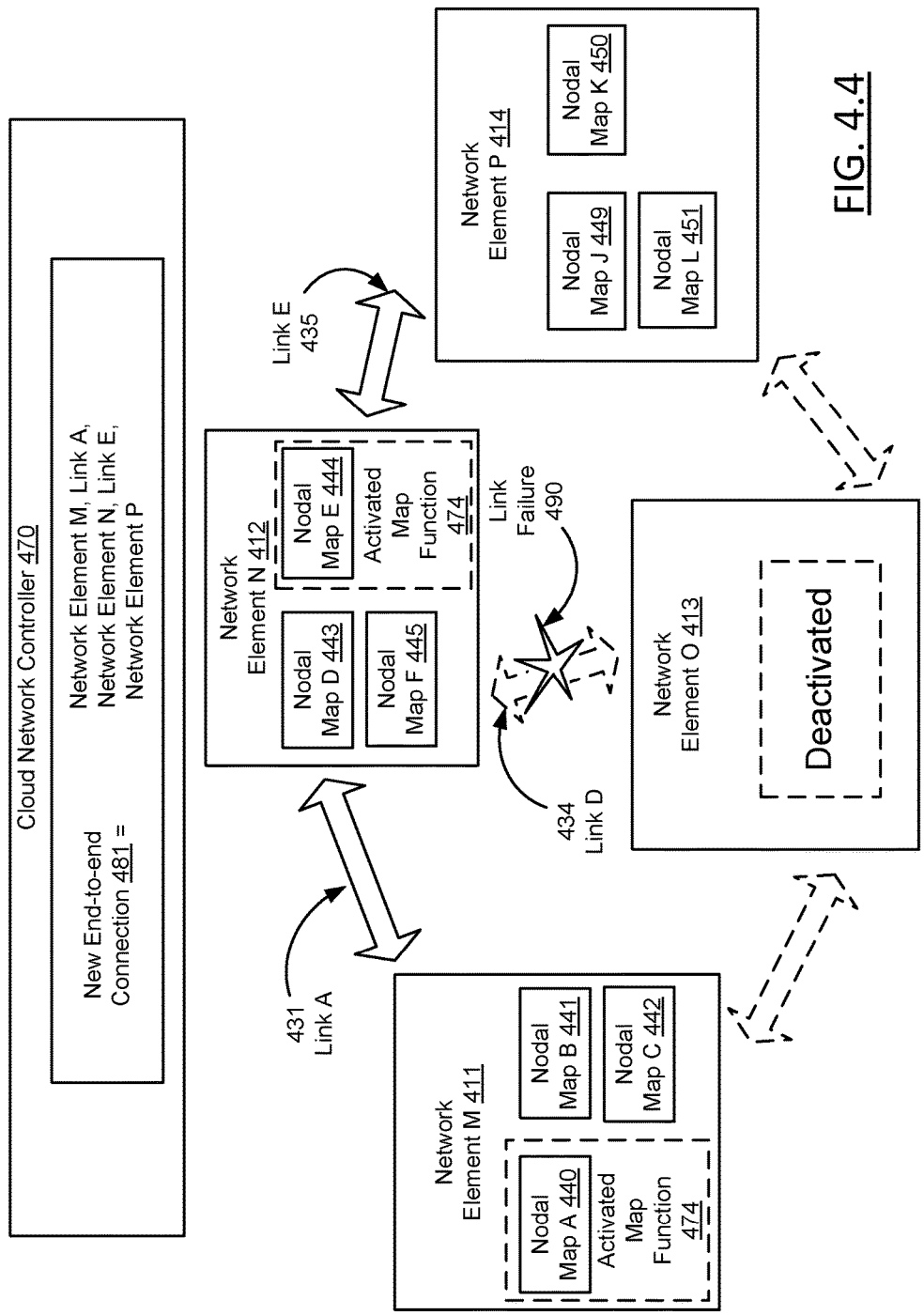
FIG. 4.4

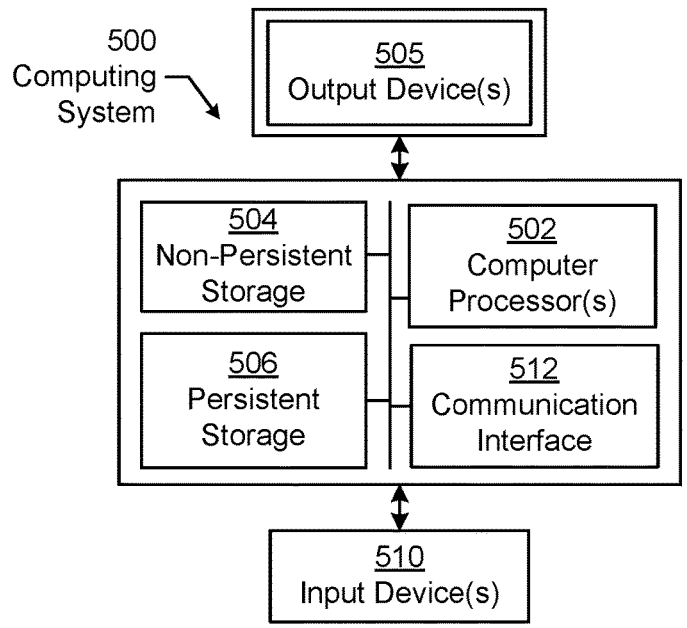
*FIG. 5.1*
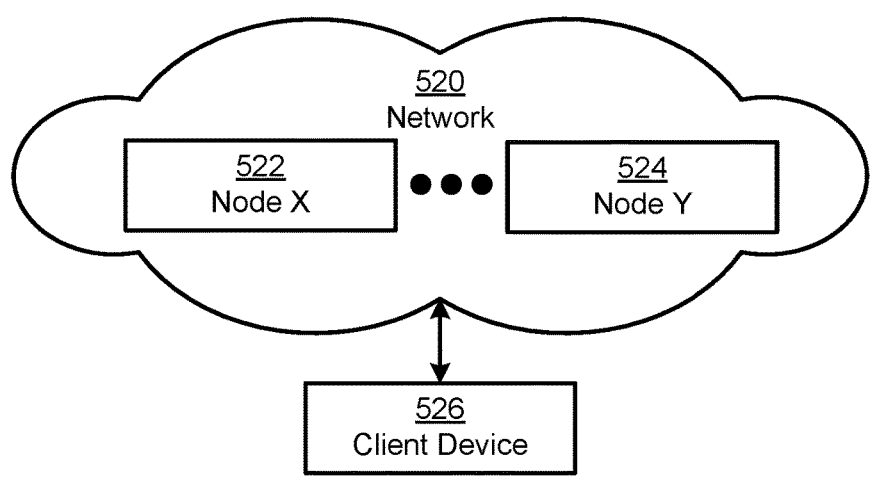
*FIG. 5.2*

SYSTEM AND METHOD FOR MANAGING NETWORK CONNECTIONS

BACKGROUND

Many different paths exist within many networks for establishing end-to-end connections. For example, a variety of different links and nodes may be used to communicate between a single node and a distant node within a network. The nodes and links may be included in a routing table for managing communication within the network. As such, discovering and establishing network connections within the network may include a large amount of time to implement and adjust various data routes within the network.

SUMMARY

In general, in one aspect, the invention relates to a method for managing network connections. The method includes identifying a network failure within a network including various network elements. The method further includes selecting, in response to identifying the network failure and for the network elements, a subset of nodal maps from various nodal maps. The nodal maps are stored on the network elements. The subset of nodal maps describes various cross-connections of the nodal maps within a first end-to-end connection in the network. The method further includes transmitting, in response to selecting the subset of nodal maps, various activation requests to trigger the network elements to implement the subset of nodal maps.

In general, in one aspect, the invention relates to a system for managing a network. The system includes various network elements and a network controller. The network controller is configured to identify a network failure among the network elements. The network controller is further configured to select, in response to identifying the network failure and for the network elements, a subset of nodal maps from various nodal maps. The nodal maps are stored on the network elements. The subset of nodal maps describes a various cross-connections of the nodal maps within a first end-to-end connection among the network elements. The network controller is further configured to transmit, in response to selecting the subset of nodal maps, various activation requests to trigger the network elements to implement the subset of nodal maps.

In general, in one aspect, the invention relates to a non-transitory computer readable medium (CRM) storing various instructions for managing network connections. The instructions include functionality for identifying a network failure within a network including various network elements. The instructions further include functionality for selecting, in response to identifying the network failure and for the network elements, a subset of nodal maps from various nodal maps. The nodal maps are stored on the network elements. The subset of nodal maps describes various cross-connections of the nodal maps within a first end-to-end connection in the network. The instructions further include functionality for transmitting, in response to selecting the subset of nodal maps, various activation requests to trigger the network elements to implement the subset of nodal maps.

Other aspects of the invention will be apparent from the following description and the appended claims.

BRIEF DESCRIPTION OF DRAWINGS

FIGS. 1.1 and 1.2 show a system in accordance with one or more embodiments.

FIGS. 4.1, 4.2, 4.3, and 4.4 show an example in accordance with one or more embodiments.

FIGS. 5.1 and 5.2 show a computing system in accordance with one or more embodiments.

DETAILED DESCRIPTION

Figure 2:
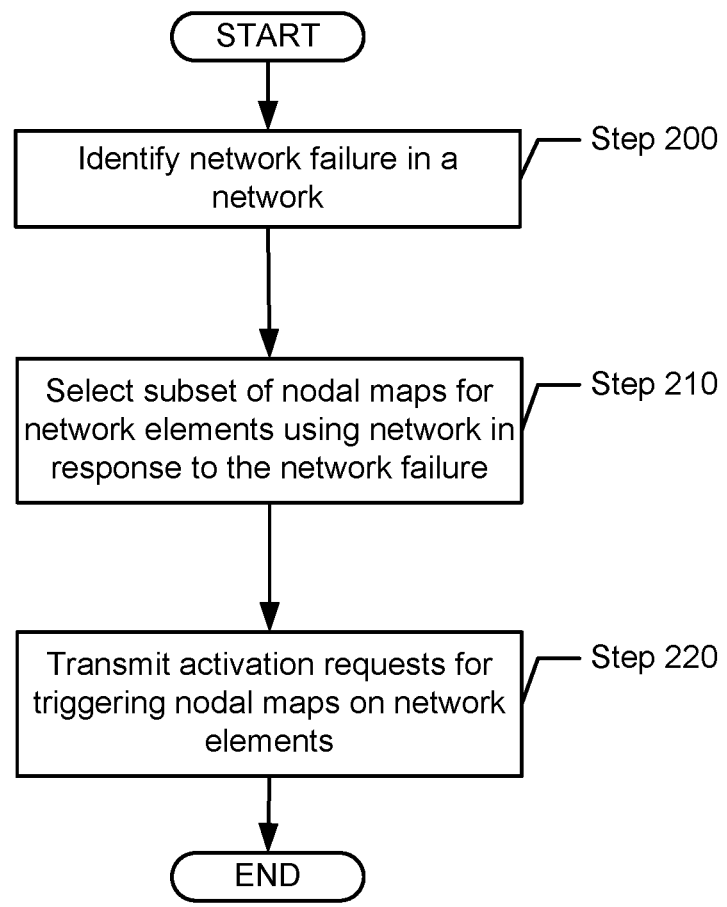
FIGS. 2 and 3 show flowcharts in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a system and various methods for managing network connections. In particular, one or more embodiments are directed to a method that includes selecting a particular nodal map for a particular network element in response to a network failure. A nodal map may describe a set of cross-connections at a particular element used to reroute end-to-end connections, for example, around the network failure. Furthermore, nodal maps may be pre-stored on network elements throughout the network, and thereby allowing a network controller to trigger a particular nodal map on a particular network element in a short period of time. Rather than reconfiguring cross-connections and links individually between various network elements, a network controller may transmit several activation requests to affected network elements that activate nodal maps and reconfigure the network around the network failure accordingly.

FIGS. 1.1 and 1.2 show a block diagram of a system in accordance with one or more embodiments. As shown in FIGS. 1.1 and 1.2, a network (110) may include various network elements (i.e., network element A (111), network element B (112), network element C (113)) that may be operably connected to a network controller (170). The network elements (111, 112, 113) may be computing systems similar to the computing system (500) described in FIGS. 5.1 and 5.2 and the accompanying description. The network controller (170) may be software and/or hardware implemented on the network (110). In one or more embodiments, for example, the network controller (170) is a software-defined network (SDN) controller. In particular, an SDN controller may be implemented using hardware and/or software distributed across multiple platforms, e.g., the network elements (111, 112, 113) as well as other network elements not shown in FIGS. 1.1 and 1.2. Moreover, the network elements (111, 112, 113) may be connected by various network links (e.g., network link X (131), network link Y (132)).

In one or more embodiments, the network controller (170) includes functionality to transmit various nodal maps (e.g., nodal map A (146), nodal map B (147), nodal map C (148)). In one or more embodiments, for example, a nodal map corresponds to data that describes adjacent links and cross-connections at a particular network element within an end-to-end connection on the network (110). In another example, the nodal map may correspond to a data structure that includes a desired set of hardware cross-connections defined based on ingress ports and egress ports of a network element. In one or more embodiments, for example, a nodal map describes all cross-connections for all network links that are present on a node when a network failure occurs to a node, network link, to a shared link risk group, or if another type of network failure occurs. As such, a nodal map may include the set of cross-connections that need to be present in hardware on a network element. In one or more embodiments, for example, various types of nodal maps are illustrated by the following data structures:

Nodal Map Type 1: Ingress Port [timeslot(s)] X Egress Port [timeslot(s)]

Nodal Map Type 2: Ingress Port [lambda] X Egress Port [lambda]

Nodal Map Type 3: Ingress Port [label] X Egress Port [label]

where nodal map type 1 corresponds to a nodal map for Synchronous Optical Networking (SONET) and Synchronous Digital Hierarchy (SDH) network and OTN (Optical Transport Network). Nodal map type 2 corresponds to a Dense Wavelength Division Multiplexing (DWDM) network. On the other hand, nodal map type 3 corresponds to a Multiprotocol Label Switching (MPLS) network. Thus, the type of nodal maps used by a network element may be dependent on the type of network.

The network controller (170) may include functionality to store a network map (140) of the network (110). For example, the network map (140) may describe network elements used by various end-to-end connections throughout the network (110). An end-to-end connection may be a network route between one end point, e.g., a network element representing a network node, and another endpoint, e.g., a different network element representing another network node, within the network (110). As such, the network map (140) may include aggregate link information (141) that describes network links that exist between various network elements as well as network links that form the end-to-end connections. For example, the aggregate link information (141) may include link information A (181), link information B (182), and link information C (183).

Likewise, the network map (140) may include aggregate cross-connection information (142) that describes cross-connections on various network elements, such as the cross-connections used in end-to-end connections. For example, the aggregate cross-connection information (142) may include cross-connection information A (186), cross-connection information B (187), and cross-connection information C (188). In one or more embodiments, the network controller (170) includes functionality to generate the nodal maps (146, 147, 148) using the network map (140).

Keeping with FIGS. 1.1 and 1.2, the network controller (170) may include a network monitor (160) with functionality to identify one or more network failures (e.g., network failure (135)) in the network (110). In particular, the network monitor (160) may be hardware and/or software with functionality to analyze network data transmitted over the network (110) to detect the existence of one or more network failures in the network (110). Accordingly, network failures may relate to hardware and/or software disruptions on an intervening network element within an end-to-end connection, for example. Thus, a network failure may be the result of a sudden burst of network congestion at a portion of the network (110). On the other hand, a network failure may be a situation where a network link between two network elements terminates. For example, a network failure may be a network fault caused by an optical fiber being physically broken or disconnected between two adjacent network elements. Thus, the network fault may cause the respective network link to stop operating. Accordingly, network failures encompass a wide variety of network phenomena that may cause one or more end-to-end connection to fail.

In one or more embodiments, the network controller (170) includes a nodal map calculator (150) with functionality to generate and/or select various nodal maps in response to identifying a network failure on the network (110). In particular, the nodal map calculator (150) may determine which network elements are affected by a network failure in an end-to-end connection. Accordingly, the network controller (170) may compute various network adjustments for replacing links and/or cross-connections within the network (110) to address a particular network failure, such as by reestablishing an end-to-end connection around an area affected by the particular network failure.

In one or more embodiments, the network controller (170) includes functionality to implement various nodal maps throughout the network (110) using one or more activation requests (e.g., activation request A (161), activation request B (163)). An activation request may be a command that includes functionality to trigger a particular nodal map (e.g., nodal map A (146)) stored on a network element (e.g., network element A (111)). For example, an activation request may be a data message that identifies a particular nodal map from a group of nodal maps. Furthermore, the nodal map calculator (150) may select the nodal map that relates to a particular activation request, and the network controller (170) may transmit the activation request.

In one or more embodiments, the network controller (170) includes functionality to transmit a termination request (e.g., termination request (162)) to a network element (e.g., network element B (112)). A termination request may remove a network element from use as a node within a routing table of the network (110). For example, a termination request may remove the deactivated network element from use in an end-to-end connection between endpoints. Rather than trigger a nodal map on a network element, the termination request may be a command that includes functionality to remove the links and/or cross-connections associated with the particular network element.

In one or more embodiments, the network (110) does not operate with a control plane. Specifically, a control plane may be part of a decentralized network architecture implemented on individual network elements. For example, a control plane may include hardware and/or software configured for routing data and establishing links and/or network connections between adjacent network elements outside of a data plane. The data plane may include the network layer with functionality for transmitting packets between endpoints on a network. Accordingly, the network controller (170) may perform similar functionality as performed by a control plane using a centralized network architecture.

Turning to FIG. 2, FIG. 2 shows a flowchart in accordance with one or more embodiments. Specifically, FIG. 2 describes a method for triggering a nodal map on a network element. One or more steps in FIG. 2 may be performed by one or more components (e.g., network controller (170)) as described in FIGS. 1.1 and 1.2. While the various steps in FIG. 2 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 200, a network failure is identified in a network in accordance with one or more embodiments. In one or more embodiments, for example, a network controller monitors the network for network faults and any other failures related to end-to-end connections within the network. The network controller may be similar to the network controller (170) described in FIGS. 1.1 and 1.2 and the accompanying description. In one or more embodiments, for example, in order to determine a network failure, the network controller pings various network elements. If an acknowledgment is not received from the pinged network elements, the network controller may determine that a network failure exists based on the lack of an acknowledgment.

Likewise, individual network elements may determine whether a network failure exists and transmit a notification of the network failure to the network controller, accordingly. For example, a network element may determine a network failure based on whether an optical signal is obtained over an optical fiber connecting the network element with an adjacent network element.

In Step 210, a subset of nodal maps is selected in response to a network failure in accordance with one or more embodiments. In one or more embodiments, for example, a network controller uses a network map or any other network information collected about the network to produce one or more nodal maps stored on individual network elements on the network. In one or more embodiments, for example, the network controller may determine multiple potential network failures that may affect a particular cross-connection. Specifically, the potential network failures may correspond to network scenarios that cause the end-to-end connection to terminate or degrade in performance. Accordingly, for each potential network failure, the network controller may compute a nodal map for each network element in the end-to-end connection to address the respective potential network failure. Thus, in one or more embodiments, when the network failure actually occurs in the network, the network controller can respond rapidly to the actual network failure with a subset of nodal maps that address the problem. For example, the subset of nodal maps may reestablish the end-to-end connection with the actual network failure or implement an alternate end-to-end connection to circumvent the actual network failure.

Furthermore, keeping with Step 210, for example, the network controller may determine which nodal maps to trigger to address the network failure. In other words, the subset of nodal maps may change the links and cross-connections at various respective network elements in order to establish an alternative network route for a particular end-to-end connection.

In another example, the network controller may determine that performance over the network can be optimized by rerouting network activity around a problematic area in the network. Thus, one or more nodal maps may be selected to reroute the network activity to circumvent the problematic area accordingly.

In Step 220, various activation requests for triggering the subset of nodal maps are transmitted to various network elements in accordance with one or more embodiments. As various network elements in a network may implement a data forwarding plane that route network data from one endpoint to a different endpoint in the network, the activation requests may cause the network elements to reconfigure various cross-connections within the data forwarding plane. The activation requests may reestablish end-to-end connections, eliminate particular end-to-end connections, and/or establish new end-to-end connections among the network elements. Accordingly, in one or more embodiments, the network controller may reconfigure the data forwarding plane in a hierarchical manner without using a decentralized control plane among the network elements.

Moreover, an activation request may correspond to a small amount of data that identifies a particular nodal map on a respective network element. Thus, rather than communicate a series of network instructions over the network in order to rearrange the network, the network controller may communicate which nodal map needs to be used by various network elements. Therefore, based on one or more nodal maps selected in Step 210, a network controller may transmit activation requests to the respective network elements accordingly. Thus, the network controller may reorganize a portion of the network and address the network failure identified in Step 200.

Using activation requests to trigger pre-stored nodal maps may fix or address network failures in less time and with fewer network resources than similar activities performed by a control plane. Activation requests may provide less network traffic than having a network controller transmit individual requests to delete and/or add cross-connections at individual network elements. Moreover, by using activation requests rather than transmitting nodal maps in response to a network failure, a network may address the network failure in a shorter amount of time. In one or more embodiments, for example, a network controller may send one activation request to active a particular nodal map at one node rather than sending individual network messages to the node to delete each cross-connection and add new cross-connections at the node.

Figure 3:
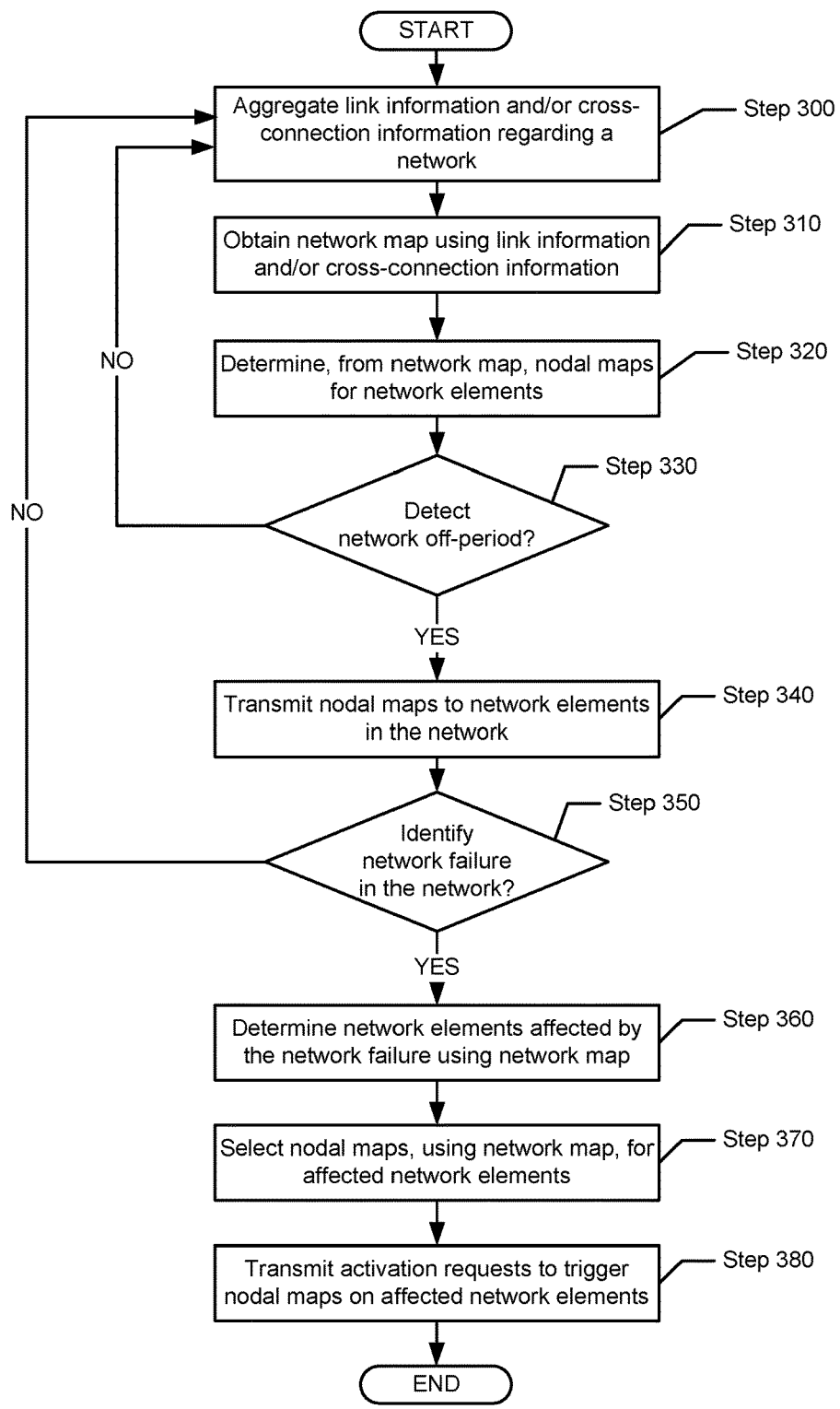

Turning to FIG. 3, FIG. 3 shows a flowchart in accordance with one or more embodiments. Specifically, FIG. 3 describes a method for loading nodal maps on network elements throughout a network and triggering selected nodal maps in response to a particular network failure. One or more steps in FIG. 3 may be performed by one or more components (e.g., network controller (170)) as described in FIGS. 1.1 and 1.2. While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, link information and/or cross-connection information regarding a network is aggregated in accordance with one or more embodiments. For example, a network controller may store link information and/or cross-connection information in a network cache on the network. The network controller may identify using a table which cross-connections and links are associated with a particular network element, as well as which end-to-end connections are associated with the network element.

In Step 310, a network map is obtained using link information and cross-connection information in accordance with one or more embodiments. For example, a network controller may collect data regarding routes, links, and/or cross-connections that exist throughout the network. In particular, the network controller may detect how various end-to-end connections are established throughout the network and organize the end-to-end connections within a table and/or other data structure. In one or more embodiments, for example, the network map provides various alternative routes to connecting endpoints within the network.

In Step 320, various nodal maps are determined, using a network map, for various network elements in accordance with one or more embodiments. For example, a nodal map calculator may determine and redetermine various nodal maps based on a changing network topology of the network. Moreover, different nodal maps for the same network element may be generated in case of different network failure scenarios. As such, nodal maps may be adjusted periodically by a nodal map calculator to account for changing network resources within the network and/or with respect to different optimization algorithms. For example, a new set of nodal maps for a network element may be determined for different types of network failures when one or more network elements are added and/or removed from the network. Thus, as the network map from Step 310 is updated over time, new nodal maps may be determined using updated cross-connection and link information from Step 300.

Furthermore, in one or more embodiments, one or more nodal maps are modularized to reduce the amount of data contained in the nodal maps stored throughout the network. For example, a set of nodal maps may have a common set of cross-connection configurations, such that cross-connections between two nodal maps within the set may differ by a small fraction, e.g., only 10% of the cross-connections. In one or more embodiments, a base nodal map provides primary cross-connection information for configuring other secondary nodal maps in the set. Accordingly, a secondary nodal map may describe differences in cross-connections between the secondary nodal map and the primary nodal map. In other words, the base nodal map may represent 90% of the cross-connection information among the set of nodal maps on a particular network element. However, a particular secondary nodal map may describe the remaining 10% of the cross-connections that differ among a set of secondary nodal maps.

In Step 330, a determination is made whether a network off-period is detected in accordance with one or more embodiments. For example, a network controller may monitor network activity over a network until the amount of network activity falls below a predetermined threshold. Accordingly, a network off-period may correspond to a period of time identified by the network controller as being below the predetermined threshold. When network activity increases above the predetermined threshold, the network controller may determine that the network is outside a network off-period. When a determination is made that the network is operating during a network off-period, the process may proceed to Step 340. When a determination is made that the network is outside a network off-period, the process may proceed to Step 300.

In Step 340, various nodal maps are transmitted in accordance with one or more embodiments. In one or more embodiments, for example, a network controller may transmit nodal maps determined in Step 320 to network elements throughout the network. In particular, the network controller may transmit nodal maps during a network off-period so that the transmission does not interfere with other network activity. On the other hand, the network controller may transmit nodal maps at periodic intervals without respect to other network activity, e.g., each night at 2:00 AM Eastern Time. Furthermore, once nodal maps are stored on a particular network element, the network controller may only transmit new and/or adjusted nodal maps when a new or adjusted nodal map is determined in Step 320. Accordingly, pre-stored nodal maps may not change until a new scenario is determined by a network controller for addressing a network failure and/or a change occurs to the network topology of the network.

In one or more embodiments, in Step 340, the network controller transmits secondary nodal maps as described in Step 320 and the accompanying description to various network elements. Thus, a primary nodal map may be stored on each network element and may not change based on nodal map adjustments in Step 320.

In Step 350, a determination is made whether a network failure has been identified in a network in accordance with one or more embodiments. In one or more embodiments, a network monitor analyzes a network until a network failure is detected. When a determination is made that a network failure has been identified, the process may proceed to Step 360. When a determination is made that no network failures exist on the network, the process may proceed to Step 300. Furthermore, when no network failures exist with the network, Steps 300-350 may be continually repeated until a network failure occurs and is detected on the network. Once a network failure is identified, the method may proceed to Steps 360-380 in order to address the identified network failure.

In Step 360, various network elements affected by a network failure are determined using a network map in accordance with one or more embodiments. Based on one or more network failures identified in Step 350, a network controller may identify which network elements are located in an affected area of the network. For example, the network controller may identify as affected network elements those network elements that form part of an end-to-end connection that is terminated by the network failure. On the other hand, a network element in the vicinity of a network failure and/or a network element used to reestablish an end-to-end connection may also be identified as an affected network element.

In Step 370, various nodal maps are selected for various affected network elements in accordance with one or more embodiments. In one or more embodiments, for example, the nodal maps are selected in a similar manner as Step 220 and the accompanying description.

In Step 380, various activation requests to trigger various nodal maps are transmitted to affected network elements in accordance with one or more embodiments. In one or more embodiments, for example, the activation requests are transmitted to the affected network elements in a similar manner as Step 230 and the accompanying description.

Turning to FIGS. 4.1, 4.2, 4.3, and 4.4, FIGS. 4.1, 4.2, 4.3, and 4.4 provide an example of managing a network with nodal maps. The following example is for explanatory purposes only and not intended to limit the scope of the invention.

Turning to FIG. 4.1, a cloud network controller (470) is shown managing various network elements (e.g., network element M (411), network element N (412), network element O (413), and network element P (414)) and various network links (e.g., link A (431), link B (432), link C (433), link D (434), and link E (435)). During an earlier network off-period, the cloud network controller (470) transmitted various nodal maps (e.g., nodal map A (440), nodal map B (441), nodal map C (442), nodal map D (443), nodal map E (444), nodal map F (445), nodal map G (446), nodal map H (447), nodal map I (448), nodal map J (449), nodal map K (450), and nodal map L (451)) on to the network elements (411, 412, 413, and 414). While monitoring an end-to-end connection (480), the cloud network controller (470) identifies that a link failure (490) exists in the end-to-end connection (480).

Turning to FIG. 4.2, the cloud network controller (470) analyzes the network elements (411, 412, 413, 414) using a network failure detection function (471) and identifies the link failure (490) is located at link D (434). In particular, the cloud network controller (470) uses an affected network elements function (472) to determine that the link failure (490) affects network element M (411), network element N (412), and network element O (413) within the end-to-end connection (480). Accordingly, the cloud network controller (470) uses a nodal map determination function (473) to determine that activation of nodal map A (440) and nodal map E (444) addresses the link failure (490) and restores the end-to-end connection (480).

Turning to FIG. 4.3, the cloud network controller (470) sends an activation request (461) to network element M (411) to activate nodal map A (440), as well as an activation request (462) to network element N (412) to activate nodal map E (444). The cloud network controller (470) also sends a termination request (463) to network element O (413) to delete cross-connections on network element O (413) and deactivate network element O (413) from use in the new end-to-end connection (481). Likewise, the cloud network controller (470) is not making any changes to network element P (414), neither an activation request or a termination request is being sent to network element P (414).

Turning to FIG. 4.4, the network element M (411) uses an activated map function (474) to activate nodal map A (440). Accordingly, nodal map A (440) causes network element M (411) to switch from the network port for link B (432) to the network port for link A (431). On network element N (412), the network element N (412) uses the activated map function (474) to activate nodal map E (444). Accordingly, nodal map E (444) causes network element N (412) to switch from using a network port for link D (434) to the network port for link A (431). Thus, nodal map A (440) and nodal map E (444) are used by the cloud network controller (470) to establish a new end-to-end connection (481) from network element M (411) to network element P (414) using link A (431) rather than link B (432).

Embodiments may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (507), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the invention.

The computing system or group of computing systems described in FIGS. 5.1 and 5.2 may include functionality to perform a variety of operations disclosed herein. For example, the computing system(s) may perform communication between processes on the same or different systems.

A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5.1 and the nodes and/or client device in FIG. 5.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing network connections implemented by a network controller, comprising:
   determining each potential network failure of a plurality of network failures for a first end-to-end connection in a network with a plurality of network elements;
   computing a plurality of nodal maps for each determined potential failure, wherein each nodal map describes cross-connections at a corresponding network element to address the network failure and each network element has multiple nodal maps each addressing a different network failure;
   identifying a network failure within the network;
   selecting, in response to identifying the network failure and for corresponding network elements of the plurality of network elements, a subset of nodal maps from the plurality of nodal maps, wherein the plurality of nodal maps is stored on the corresponding network elements of the plurality of network elements, and wherein the subset of nodal maps describes a plurality of cross-connections of the corresponding network elements to re-route a first end-to-end connection in the network due to the network failure between associated ingress ports and associated egress ports;

transmitting, in response to selecting the subset of nodal maps, a plurality of activation requests to trigger the plurality of network elements to implement the subset of nodal maps;
determining a plurality of individual nodal maps for a first network element among the plurality of network elements;
determining that the network failure terminates a second end-to-end connection comprising the first network element;
selecting, based on determining that the network failure terminates the second end-to-end connection, a nodal map from the plurality of individual nodal maps; and
establishing, using the nodal map from the plurality of individual nodal maps, a third end-to-end connection comprising the first network element,
wherein the plurality of nodal maps comprises a base nodal map, wherein the subset of nodal maps comprises a secondary nodal map, and wherein the second end-to-end connection and the third end-to-end connection share a first plurality of cross-connections at a second network element among the plurality of network elements as described in the base nodal map, and wherein the second network element has a second plurality of cross-connections for the second end-to-end connection that differs from a third plurality of cross-connections at the second network element for the third end-to-end connection.

2. The method of claim 1, further comprising:
subsequent to the computing, transmitting, to respective network elements, the plurality of nodal maps for each potential network failure from the plurality of potential network failures.

3. The method of claim 1, wherein the network failure is selected from a group consisting of:
a nodal failure, a link failure, and a shared link risk group (SLRG) failure.

4. The method of claim 1, wherein the plurality of network elements implements a data forwarding plane, and wherein the plurality of activation requests comprises an activation request that causes a network element among the plurality of network elements to reconfigure one or more cross-connections within the data forwarding plane to reestablish the first end-to-end connection.

5. The method of claim 1, further comprising:
obtaining a network map regarding the plurality of network elements, wherein the network map describes link information and cross-connection information regarding the plurality of network elements.

6. The method of claim 1, further comprising:
detecting a network off-period among the plurality of network elements, wherein the network off-period corresponds to a period in time when an amount of network traffic over the network falls below a predetermined threshold; and
transmitting, in response to detecting the network off-period, the plurality of nodal maps to the plurality of network elements.

7. The method of claim 1, wherein identifying the network failure comprises detecting that a link is disconnected between a first adjacent network element and a second adjacent network element.

8. The method of claim 1, wherein the network failure is identified by a software-defined network controller, and wherein the software-defined network controller transmits the plurality of activation requests to the plurality of network elements.

9. The method of claim 8, wherein the software-defined network controller administers, without using a control plane, a plurality of end-to-end connections among the plurality of network elements.

10. A system for managing network connections, comprising:
a plurality of network elements; and
a network controller, wherein the network controller is configured to
determine each potential network failure of a plurality of network failures for a first end-to-end connection in a network with a plurality of network elements,
compute a plurality of nodal maps for each determined potential failure, wherein each nodal map describes cross-connections at a corresponding network element to address the network failure and each network element has multiple nodal maps each addressing a different network failure;
identify a network failure among the plurality of network elements;
select, in response to identifying the network failure and for corresponding network elements of the plurality of network elements, a subset of nodal maps from the plurality of nodal maps, wherein the plurality of nodal maps is stored on the corresponding network elements of the plurality of network elements, and wherein the subset of nodal maps describes a plurality of cross-connections of the corresponding network elements to re-route a first end-to-end connection among the plurality of network elements due to the failure between associated ingress ports and associated egress ports;
transmit, in response to selecting the subset of nodal maps, a plurality of activation requests to trigger the plurality of network elements to implement the subset of nodal maps;
determine a plurality of individual nodal maps for a network element among the plurality of network elements;
determine that the network failure terminates a second end-to-end connection comprising the network element;
select, based on determining that the network failure terminates the second end-to-end connection, a nodal map from the plurality of individual nodal maps; and
establish, using the nodal map from the plurality of individual nodal maps, a third end-to-end connection comprising the network element,
wherein the plurality of nodal maps comprises a base nodal map, wherein the subset of nodal maps comprises a secondary nodal map, and wherein the second end-to-end connection and the third end-to-end connection share a first plurality of cross-connections at a second network element among the plurality of network elements as described in the base nodal map, and wherein the second network element has a second plurality of cross-connections for the second end-to-end connection that differs from a third plurality of cross-connections at the second network element for the third end-to-end connection.

11. The system of claim 10, wherein the network controller is further configured to:
subsequent to computation transmit, to respective network elements, the plurality of nodal maps for each potential network failure from the plurality of potential network failures.

12. The system of claim 10, wherein the plurality of network elements implements a data forwarding plane, and wherein the plurality of activation requests comprises an activation request that causes a network element among the plurality of network elements to reconfigure one or more cross-connections within the data forwarding plane to reestablish the first end-to-end connection.

13. A non-transitory computer readable medium storing instructions for managing network connections, the instructions comprising functionality in a network controller for:
   determining each potential network failure of a plurality of network failures for a first end-to-end connection in a network with a plurality of network elements;
   computing a plurality of nodal maps for each determined potential failure, wherein each nodal map describes cross-connections at a corresponding network element to address the network failure and each network element has multiple nodal maps each addressing a different network failure;
   identifying a network failure within the network;
   selecting, in response to identifying the network failure and for corresponding network elements of the plurality of network elements, a subset of nodal maps from the plurality of nodal maps, wherein the plurality of nodal maps is stored on the corresponding network elements of the plurality of network elements, and wherein the subset of nodal maps describes a plurality of cross-connections of the corresponding network elements to re-route a first end-to-end connection in the network due to the failure between associated ingress ports and associated egress ports;
   transmitting, in response to selecting the subset of nodal maps, a plurality of activation requests to trigger the plurality of network elements to implement the subset of nodal maps;
   determining a plurality of individual nodal maps for a first network element among the plurality of network elements;
   determining that the network failure terminates a second end-to-end connection comprising the first network element;
   selecting, based on determining that the network failure terminates the second end-to-end connection, a nodal map from the plurality of individual nodal maps; and
   establishing, using the nodal map from the plurality of individual nodal maps, a third end-to-end connection comprising the first network element,
   wherein the plurality of nodal maps comprises a base nodal map, wherein the subset of nodal maps comprises a secondary nodal map, and wherein the second end-to-end connection and the third end-to-end connection share a first plurality of cross-connections at a second network element among the plurality of network elements as described in the base nodal map, and wherein the second network element has a second plurality of cross-connections for the second end-to-end connection that differs from a third plurality of cross-connections at the second network element for the third end-to-end connection.

14. The non-transitory computer readable medium of claim 13, wherein the instructions further comprise functionality for:
   subsequent to the computing, transmitting, to respective network elements, the plurality of nodal maps for each potential network failure from the plurality of potential network failures.

15. The non-transitory computer readable medium of claim 13, wherein the plurality of network elements implement a data forwarding plane, and wherein the plurality of activation requests comprises an activation request that causes a network element among the plurality of network elements to reconfigure one or more cross-connections within the data forwarding plane to reestablish the first end-to-end connection.

16. The non-transitory computer readable medium of claim 13, wherein the instructions further comprise functionality for:
   detecting a network off-period among the plurality of network elements, wherein the network off-period corresponds to a period in time when an amount of network traffic over the network falls below a predetermined threshold; and
   transmitting, in response to detecting the network off-period, the plurality of nodal maps to the plurality of network elements.

17. The non-transitory computer readable medium of claim 13, wherein identifying the network failure comprises detecting that a link is disconnected between a first adjacent network element and a second adjacent network element in the network.

* * * * *